Aug. 3, 1937.                G. T. COOKE                2,088,637
                     COTTER PIN LOCKING DEVICE
                       Filed Jan. 30, 1937
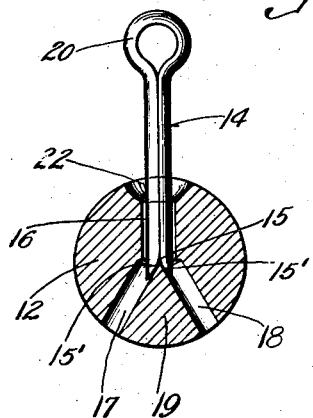
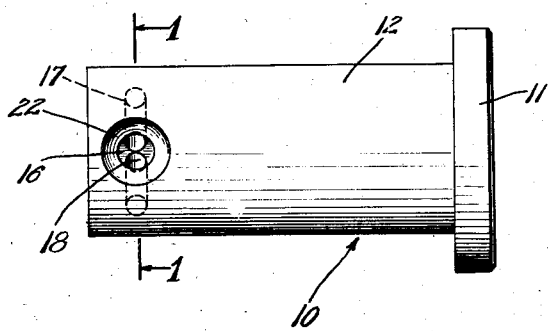
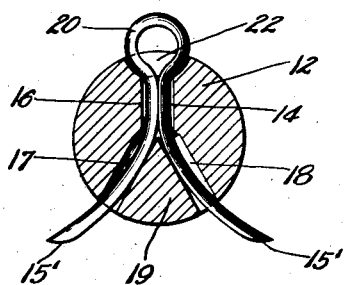
INVENTOR
George T. Cooke
BY
ATTORNEY Patented Aug. 3, 1937

2,088,637

UNITED STATES PATENT OFFICE 2,088,637

COTTER PIN LOCKING DEVICE

George T. Cooke, Norwalk, Conn., assignor to American Railway Products Co., Inc., Darien, Conn.

Application January 30, 1937, Serial No. 123,190

3 Claims. (Cl. 85—7)

This invention relates to new and useful improvements in cotter pin locking devices, wherein a cotter pin is automatically spread and locked in place, as disclosed in my Re. Patent No. 17,729, instead of requiring a separate manual act.

Locking devices of the aforesaid automatic type have entrance and outlet or spreader bores. However, difficulty is sometimes encountered in distinguishing the entrance bore from the spreader bores. To overcome this difficulty resort has been made to having the outlet or spreader bores spaced quite closely together and remotely from the entrance bore where they emerge from the device. Such an arrangement, though, has the disadvantage of imparting only a slight spreading and holding or locking distortion to the cotter pin. Another effort to overcome this shortcoming is disclosed in my aforementioned Re. Patent No. 17,729 and includes the provision of stops at the inner ends of the spreader bores. Such a structure, although it is a step in the right direction, has not proved entirely satisfactory as the operator still works more or less 'blind' and may adversely strike the cotter pin and cause it to be mushroomed by the stop shoulder instead of spread by the wedge on the inside of the device. Also, in some of these prior devices the cotter pin was sheared by the top or outer edge of the entrance bore when the head of the cotter pin was moved adjacent the device.

It is an object of the present invention to provide a cotter pin locking device overcoming the shortcomings hereinbefore noted.

A featue of the present invention is the provision of an angularly disposed enlarged bore section coextensive with the entrance bore to mark and distinguish the entrance bore from the spreader bores even though all three of such bores are substantially equally spaced about the device. Thus, the operator is positively apprized and enabled to distinguish the entrance bore to effect a quick and positive spreading and locking of the cotter pin in the device. This angularly disposed entrance bore serves the added function of facilitating initial entrance of the cotter pin into the device and also prevents shearing at the head of the cotter pin when it is moved fully into the operative position.

Other objects, features and advantages will appear hereinafter.

In the drawing which illustrates the present preferred embodiment of the invention:

Figure 1 is a cross sectional view taken on line 1—1 of Fig. 2, with the cotter pin initially applied.

Fig. 2 is a plan view of the large pin or stud embodying the present invention.

Fig. 3 is a view similar to Fig. 1 but shows the cotter pin in the spread or operative position.

Before describing the present improvements and mode of operation thereof in detail it should be understood that the invention is not limited to the details of construction and arrangement of parts shown in the accompanying drawing, which are merely illustrative of the present preferred embodiments, since the invention is capable of other embodiments, and the phraseology employed is for the purpose of description and not of limitation.

Referring now in detail to the drawing there is shown a large stud or pin 10, such as is commonly used in many places on railroad equipment, or the like, having a head 11 and shank 12. Normally such pins are provided with a single straight hole extending transversely through the shank, to receive a cotter pin, the free end of which is normally spread or bent outside the pin in an inconvenient manner, through the use of a screw driver, cold chisel, pliers, or the like.

According to the present invention, and similarly to the disclosure in Re. Patent No. 17,729, the present invention discloses a plurality of bores for the reception and automatic spreading of a cotter pin 14 which is preferably provided with a chamfered V-notch 15 formed by mating angularly disposed faces 15'. The shank 12 is provided with an entrance bore 16 extending to a point near the center of the shank and is also provided with two divergent outlet or spreading bores 17 and 18 forming a wedge 19 adapted to open and spread the cotter pin. In order to effect a maximum spread of the cotter pin 14 the divergent entrance and outlet bores are located at approximately equal points about the periphery of the shank 12.

With this structure it is only necessary to place the cotter pin 14 in the entrance bore 16 as shown in Fig. 1. Then by pushing the cotter pin or tapping a head 20 thereon the angular faces 15' are directed against the wedge 19 and into the divergent bores 17 and 18 to automatically spread or open the cotter pin as is clearly shown in Fig. 3.

Now, of particular importance, the present invention provides an angular bore 22 coextensive with the entrance bore 16. Preferably this angular bore 22 is of substantial size in order to distinguish it clearly from the outer ends of the spreader bores 17 and 18. Also, the angular bore is preferably made in a concave shape to conform substantially with the contour of the head 20 of the pin, thus, minimizing the danger of adversely shearing the head of the cotter pin when the latter is forced fully into operative or locking position.

The size of the angular bore 22 is preferably such that it differs substantially in appearance from the outlet ends of the spreader bores 17 and 18, whereby the entrance bore 16 may be easily viewed and distinguished from the spreader bores, or may be felt in awkward locations on railroad cars, or the like. These advantages are highly important because use of studs or pins of this general type are very often in awkward unlighted and more or less inaccessible locations.

Variations and modifications may be made within the scope of this invention, and portions of the improvements may be used without others.

Having thus described the invention what is claimed as new is:

1. In a cotter pin locking device the combination of a body having an entrance bore provided with a coextensive enlarged and angularly disposed bore at the outer end thereof; and a wedge formed by a pair of divergent spreader bores merging with the entrance bore.

2. In a cotter pin locking device the combination of a body having a shank with an entrance bore provided with a coextensive enlarged and concave bore at the outer end thereof; and a wedge formed by a pair of divergent spreader bores merging with the entrance bore.

3. In a cotter pin locking device the combination of a body having a shank with an entrance bore extending to a point transversely near the center of the shank and provided with a coextensive enlarged and angularly disposed bore near the outer end thereof; and a wedge formed by a pair of divergent spreader bores merging with the entrance bore near the center of the shank and with the outer ends thereof arcuately disposed substantially the same extent from each other and from the entrance bore.

GEORGE T. COOKE.